United States Patent [19]
Mori

[11] Patent Number: 6,015,487
[45] Date of Patent: Jan. 18, 2000

[54] COOLANT PURIFICATION SYSTEM

[75] Inventor: Kazuaki Mori, Iwata, Japan

[73] Assignee: Yamaha Hatsudoki Kabushiki Kaisha, Iwata, Japan

[21] Appl. No.: 09/063,017

[22] Filed: Apr. 20, 1998

[30] Foreign Application Priority Data

Apr. 19, 1997 [JP] Japan ..................................... 9-108611
Apr. 19, 1998 [JP] Japan ................................... 10-088379

[51] Int. Cl.⁷ ........................... B01D 17/12; B01D 35/06; B01D 35/47
[52] U.S. Cl. ........................... 210/90; 184/6.24; 210/135; 210/136; 210/137; 210/168; 210/223; 210/257.1; 210/258; 210/433.1
[58] Field of Search ................................ 210/90, 97, 130, 210/134, 135, 136, 137, 167, 168, 222, 223, 257.1, 258, 259, 433.1, 434, 695, 799, 87; 184/6.24

[56] References Cited

U.S. PATENT DOCUMENTS

| | | | |
|---|---|---|---|
| 2,303,261 | 11/1942 | Dunmire | 210/168 |
| 4,247,398 | 1/1981 | Mohri | 210/222 |
| 4,495,074 | 1/1985 | Hagiwara et al. | 210/695 |
| 4,498,987 | 2/1985 | Inaba | 210/223 |
| 4,571,302 | 2/1986 | Willson | 210/111 |
| 4,618,431 | 10/1986 | Hindman et al. | 210/137 |
| 5,147,554 | 9/1992 | Heck | 210/695 |
| 5,167,839 | 12/1992 | Widmer et al. | 210/168 |
| 5,205,686 | 4/1993 | De Caussin | 409/131 |
| 5,340,472 | 8/1994 | Heck | 210/223 |

*Primary Examiner*—Joseph W. Drodge
*Attorney, Agent, or Firm*—Knobbe, Martens, Olson & Bear LLP

[57] ABSTRACT

A number of embodiments of improved systems for cleaning contaminants from a cooling liquid for machining operations. The system includes a series flow relationship between a rare earth magnetic separator, an amorphous filter and a mechanical filter with an arrangement for ensuring balanced flow and facilitating continued operation while at least some of the filters are serviced. Also disclosed are a number of arrangements for cleaning the amorphous filter automatically without requiring excessive manual labor.

21 Claims, 6 Drawing Sheets

COOLANT PURIFICATION SYSTEM

BACKGROUND OF THE INVENTION

This invention relates to a coolant purification system and more particularly to an improved arrangement for purifying coolant utilized in machining operations.

As is well-known, many types of machining operations are utilized in conjunction with a cooling system wherein some form of liquid coolant is supplied to the machining apparatus. The coolant performs a number of functions. First and as its name implies, the function of the liquid coolant is to cool the heat that is generated by the machining operation so as to avoid over-temperature of the workpiece. In addition, the coolant serves the purpose of flushing the machined particles away from the machining area so as to improve surface finish. That is, if the particles are not removed from the machining area, they can cause surface imperfections.

Thus, the supply of coolant and its treatment is obviously an important factor in ensuring good machining. However, it is also desirable to ensure that the coolant can be recirculated so that it will not be spent and cause environmental and disposal problems. Therefore, a variety of types of devices have been employed for removing the machining particles and other foreign material from the coolant so that it can be recirculated.

Figure 1:
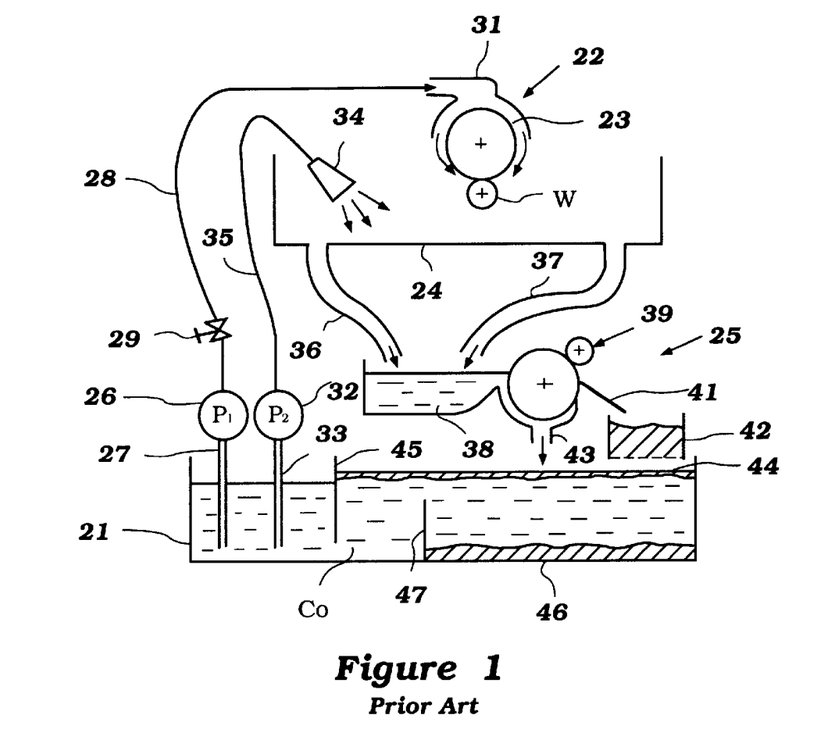
FIG. 1 is a partially schematic cross-sectional view taken through a prior art type of machining apparatus having a coolant supply and purification system.

FIG. 1 shows a conventional type of prior art machining apparatus having an arrangement for recycling and purifying the coolant. As seen in this Figure, there is provided, at an appropriate location, a coolant storage tank, indicated generally by the reference numeral 21 in which a liquid coolant of a suitable type, indicated at Co, is stored. This coolant Co is utilized at a machining station, indicated generally by the reference numeral 22, for the aforenoted purposes. That, it is employed for removing particles from the machining area and also cooling the machining operation.

As an example, the machining apparatus can include a machine tool such as a shaving cutter 23 that operates on a workpiece W to perform surface machining thereon.

This workstation 22 also includes a tray area 24 which underlies the machining station 23 in which the coolant which is circulated, in the manner to be described shortly, is accumulated and returned back to the coolant storage tank 21 after passing through a purification or filtering section, indicated generally by the reference numeral 25.

A first pump 26 has a pick-up 27 that depends into the coolant storage tank 21 and pumps it through a conduit 28 in which a manually operated flow control valve 29 is positioned. The conduit 28 delivers the coolant to a suitable shroud 31 that encircles the machining station 22 and specifically the tool 23 for washing and cooling the workpiece W and the cutting apparatus 23.

In addition, a second pump 32 also picks up cooling fluid Co from the tank 21 through a pickup tube 33. This coolant is delivered by means of a spray nozzle 34 at the end of a conduit 35 to the tray 24. This serves the function of flushing the collected coolant and machining particles and other foreign material to a pair of drain passages 36 and 37 which convey the fluid to a tank 38 of the purifying or filtering apparatus 25.

The filtering or purifying apparatus 25 is generally of the magnetic separator type having a Ferro magnetic separator 39 which collects the fluid from the tank 38 and separates particles through a chute 41 to a discharge tank 42 which must be cleaned and emptied periodically. The remaining fluid is returned to the storage tank 21 through a return conduit 43. This type of separator is generally only effective in removing particles having a size of 100 μm or greater.

In addition to the coolant Co, there is frequently oil or other lubricant in the machining operation. This other light fluid collects the particles and causes them to float in a layer indicated at 44 on top of the coolant Co in the tank 23. Normally, there is provided a separating wall 45 between the return area and the area where the pump pickups 27 and 33 are located. This is done to reduce the likelihood of picking up these floating particles. Some of the particles will precipitate in the tank 21 in this area as seen at 46. A further lower baffle wall 47 is provided inwardly from the wall 45 so as to separate these particles from the pickups 27 and 33.

There are a number of defects with this type of system. In addition to the fact that only relatively large particles are separated, the magnetic separator device 39 is generally capable of only catching about 50% of the magnetic particles contained in the circulated coolant. The remaining particles including non magnetic ones, therefore, will either float in the area 44, be solidified in the area 46 or remain entrained in the coolant and thus, continue to be circulated.

Figure 4:
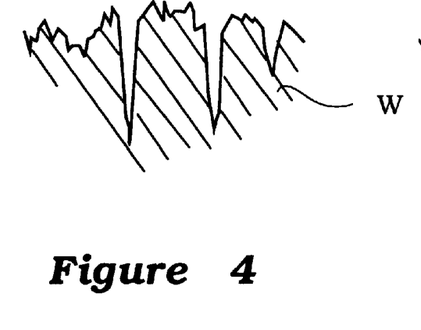
FIG. 4 is a microscopic view showing the finished surface in connection with the prior art type of system.
Figure 5:
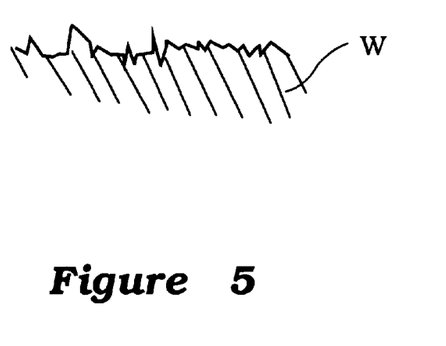
FIG. 5 is a microscopic view, in part similar to FIG. 4, but shows the finished surface in accordance with the invention.

These particles can cause, as will become apparent later by reference to FIGS. 3–5 poor surface finishes. Also, during shutdown, further precipitation in the area 46 will occur and frequently it is necessary to clean the tank after periods of non use.

It is, therefore, a principal object of this invention to provide an improved and effective way of filtering or cleaning a cooling fluid for a machining operation.

It is a further object of this invention to provide an improved arrangement for purifying cooling fluid and minimizing the amount of servicing required for the apparatus.

There are obviously other types of filtering or liquid cleaning devices that can have the ability to remove particles that have a smaller size than the magnetic type of separator. However, generally the higher the filtering capability, i.e., the ability to remove smaller particles, the more frequently the filter has to be serviced. Of course, this problem can be reduced to some extent by using large filters, but then the cost and size of the overall apparatus becomes a problem.

In addition, in order to preserve the filter life, it is generally necessary to manually clean the filter. This is not only a time-consuming and labor-intensive operation, but it also is not a very pleasant task. Furthermore, the problem of disposal of the contaminants also presents certain problems.

It is, therefore, a still further object of this invention to provide an improved coolant purifying system for a machining operation for purifying liquid coolant which will provide a high degree of filtration and which will not necessitate frequent servicing.

It is a further object of this invention to provide an improved coolant purifying system that operates over long time periods without requiring servicing and without diminishing the coolant flow.

It is a further object of this invention to provide an improved arrangement for cleaning a filter for a coolant purifying system wherein manual operations are substantially reduced or totally eliminated.

SUMMARY OF THE INVENTION

A first feature of the invention is adapted to be embodied in a system for recovery and cleaning a machine coolant. The system is comprised of a coolant storage tank for storing a liquid coolant. A machining station where a machining operation is performed is associated with the system. A coolant circulating and pumping line is provided for communicating the coolant storage tank with the machining station for supplying coolant to the machining station and returning it back to the coolant storage tank. This coolant circulation and pumping line includes a magnetic separator for magnetically separating particles from the coolant, and amorphous filter for separating particles from the coolant which are smaller in size than that separated by the magnetic separator and a mechanical filter for separating even smaller particles from the coolant. The coolant circulating and pumping line is arranged so that the coolant passes first through the magnetic separator, then through the amorphous separator and finally through the mechanical filter.

Another feature of the invention is also adapted to be embodied in a system for recovery and cleaning of a machining coolant which is comprised of a coolant storage tank for storing coolant and a machining station where a machining operation is performed. This machining station is comprised of a machining area at which a machining operation is performed and a tray area where the machining particles and coolant are collected for return back to the coolant storage tank. A coolant circulating and pumping line is provided for circulating coolant from the coolant storage tank to the machining station and back to the coolant storage tank. This line is comprised of a first coolant circulating line for circulating coolant from the coolant storage tank to the tray area for flushing coolant and other collected materials from the tray area. In addition, a second coolant circulating line is provided for circulating coolant from the coolant storage tank to the machining area for cooling the machining operation and for flushing particles for return to the tray. At least one filter device is provided in the second line between the coolant storage tank and the machining station for separating particles from the coolant. A sensor is provided in this second coolant circulating line for sensing the amount of the coolant circulated therethrough. A flow control is provided in the second line for controlling the amount of coolant flowing through the second line so as to maintain the quantity of the coolant at the desired level in response to the output of the sensor.

A third feature of the invention is adapted to be embodied in a system for automatically cleaning an amorphous filter element. This device includes a washing container in which the amorphous filter element is positioned. At least a pair of kneading devices are provided in this washing container for kneading the amorphous filter element so as to move a liquid cleaning fluid through the amorphous filter element for collection in the washing tank. A pump supplies cleaning fluid to the washing tank and a drain permits removal of the cleaning fluid and removed filter waste from the washing tank.

DETAILED DESCRIPTION OF THE PREFERRED EMBODIMENTS

Figure 2:
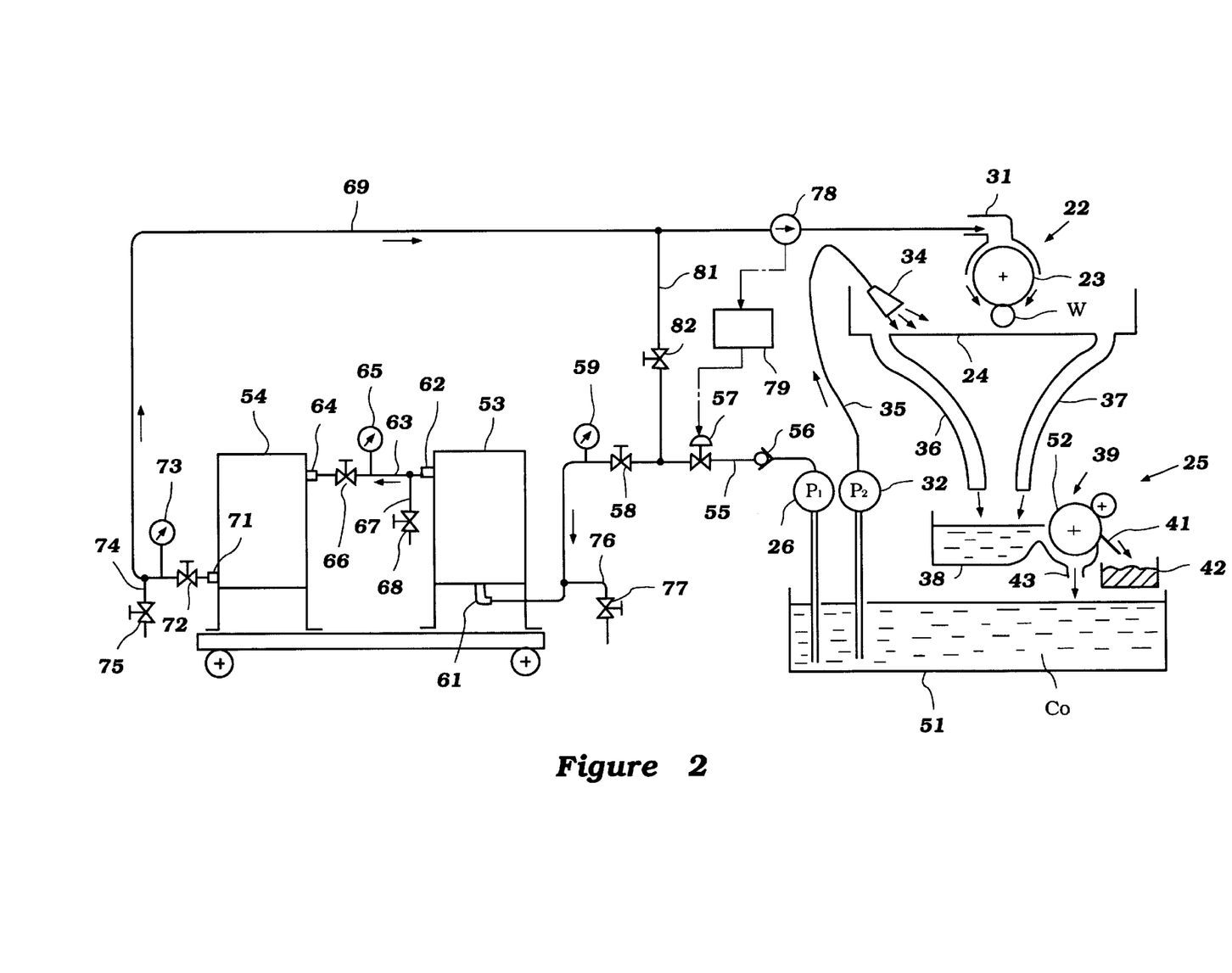
FIG. 2 is a cross-sectional view showing a machining operation and coolant supply and purification system constructed in accordance with an embodiment of the invention.

Referring now in detail to the drawings and initially to FIG. 2, a machining and cooling apparatus constructed in accordance with this embodiment is shown in part schematically. Some parts of the apparatus are the same as the prior art type construction. Where that is the case, these components have been identified by the same reference numerals and will not be described again, except insofar as is necessary to understand the construction and operation of this embodiment.

In this embodiment, the coolant storage tank is indicated generally by the reference numeral 51. This different reference numeral is employed because, in this embodiment, the storage tank for the coolant need not be baffled as with the prior art type construction shown in FIG. 1. Thus, there is a simplification of this tank and the cost of the device can therefore be somewhat reduced in this particular area of the components.

The magnetic separator 39 includes a rare earth magnetic roller 52 and which operates as a rare earth-type separator inasmuch as the magnetic particles are collected on a rare earth material contained on the roller 52. This type of separator has the ability to collect and remove about 97% of the magnetic particles and specifically those of a size of 100 $\mu$m or more. Thus, the separation on an NAS magnitude is lowered by one or two.

The NAS value is a standard by which the number and size of the entrained particles are measured. This is done by passing the fluid through a standard filter and measuring and counting the particles with an image analyzer and computer.

As has previously been noted, the prior art type of method normally uses a ferrite magnetic separator and which catches only approximately 50% of the magnetic particles and in the same general size range. Thus, the initial separation stage is significantly improved by employing the rare earth-type magnetic separator.

From the storage tank 51, there is still supplied the flushing flow through the pump 32, conduit 35 and spray nozzle 34 for performing the normal flushing operation. However, in connection with the main pumping line that is comprised of the pump 26, the system differs considerably from the prior art as will now be described in more detail.

Specifically, this system includes an amorphous filter, indicated generally by the reference numeral 53, and a mesh filter or mechanical type filter, indicated generally by the reference numeral 54. The coolant Co is delivered to these filters through a main line 55 that communicates with the pump P1.

A check valve 56 is positioned in this line between the pump 26 and a first, automatic control valve 57. The check valve 56 performs the function of permitting flow to occur from the pump 26 to the filters 53 and 54 from the tank 51. Reverse flow is precluded, however, for a reason which will be described below.

Downstream of the automatic flow control valve 57, there is provided a manual shut-off valve 58. Furthermore, a pressure indicator 59 is positioned downstream of the valves 57 and 58 and will give an indication of the back pressure in the system.

Referring now specifically to the amorphous filter 53, it has an inlet fitting 61 in its lower end so that the coolant flows upwardly through this filter element for discharge through an outlet 6 2 at a higher level. The filter element of the filter 51 is subjected to a magnetic field and is capable of removing magnetic particles and other particles having a size of 50 $\mu$m or greater.

The amorphous filter includes fibers of a metal that, when subjected to a magnetic field, provides this filtering capability. However, when removed from the magnetic field and demagnetized, it can be easily washed. Various arrangements for washing the filter element will be described later by reference, for example, to FIGS. 6 and 7.

A conduit 63 interconnects the amorphous filter outlet 62 with an inlet 64 to the mechanical or particle-type filter 54. The particle size removed by the amorphous filter 53 is 50 $\mu$m or more, as noted. The filter element of the mesh filter 54 can be woven or non-woven cloth and is capable of removing smaller contaminants having a size of 30 $\mu$m or more.

The connecting line 63 between the filters 53 and 54 includes a pressure gauge 65, and a main shut-off valve 66 which is manually operated. In addition, a drain line 67 is provided between the valve 66 and the amorphous filter outlet 62. A manually operated shut-off valve 68 can open and close this drain line for cleaning purposes.

A discharge line 69 extends from an outlet fitting 71 of the mesh filter 54 to the machining station 22 and specifically to the coolant inlet portion 31 thereof. A manually operated, normally open valve 72 is positioned in this line as is a pressure gauge 73.

There is further provided a drain line 74 which is downstream of the pressure gauge 73 and which is controlled by a manually operated drain valve 75. Again, this drain valve permits the draining of the system for servicing.

There is further provided a drain line 76 in the conduit 55 between the pressure gauge 59 and the inlet 61 to the amorphous filter 53. A manually operated valve 77 is provided for opening this drain line again for servicing purposes.

The mesh filter 54 further reduces the NAS magnitude of the containment particles by an amount of about 1 or 2, and thus further acts to improve the quality of the coolant supplied to the machining station 22.

In an important feature of the invention, there is provided a condition monitor, indicated by the reference numeral 78 in the line 69. This condition monitor 78 operates so as to optically or in some other manner sense the amount of coolant flowing. If, for some reason, the coolant flow is too low, the signal from the sensor 78 to a controller 79 is recognized and the controller 79 opens the valve 57 so as to increase the flow.

Thus, as the flow resistance due to clogging of the filters 53 and 54 goes up, the valve 57 will be automatically opened so as to maintain the desired coolant flow quantity.

A bypass line 81 is connected upstream of the sensor 78 and between the automatic valve 57 and the shut-off valve 58 for service purposes. A normally closed manually operated valve 82 is provided in this line.

Figure 3:
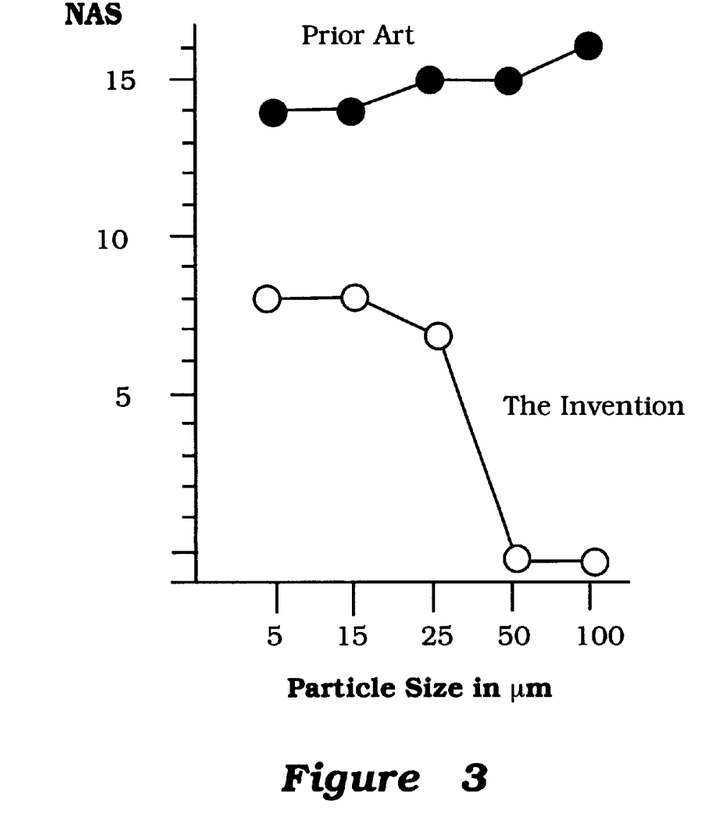
FIG. 3 is a graphical view showing the particle size in the coolant and the NAS factor both in accordance with the prior art and in accordance with this invention.

As a result of the improved filtering efficiency due to the series flow of the filter relationship, it is possible to significantly improve the particle size and contamination characteristics as may be seen in FIG. 3. The result of this on the finished product may be seen by a comparison of FIGS. 4 and 5.

These are figures of the finished surface of the workpiece W after machining by the tool 23. It may be seen that FIG. 4, which is the result of the conventional practice, there are rather large surface imperfections due to contaminants in the cooling fluid which were not removed and thus scratch the surface. With the invention, however, as shown in FIG. 5, the surface quality is much improved and there are no deep grooves as with the prior art type of construction.

By monitoring the various pressure gauges 59, 65 and 73, it is possible to determine when servicing of the filter 53 and/or 54 are required. For example, if the mesh filter 54 becomes clogged, the pressure indicated by the gauge 65 will be go up and, at the same time, the pressure of the gauge 73 will go down. Thus, it is possible to, at this time, service the filter 54 by either replacing or cleaning its mesh element in a known manner.

This can be done without shutting down the system by closing the valve 58 and opening the valve 62 so that fluid can flow directly to the machining apparatus 22 without flowing through either of the filters. Each filter 53 and 54 can be serviced by opening the respective drain lines 77, 68 and 75, and manipulating the valves 58, 66, 72, 75 and 77, respectively.

Also, if the pump 26 is stopped, even when the valves are open, any fluid cannot flow back into the system since the check valve 56 will preclude this. Thus, at the time the system is restarted, priming will not necessary be required and cleaning fluid will be available immediately.

Figure 6:
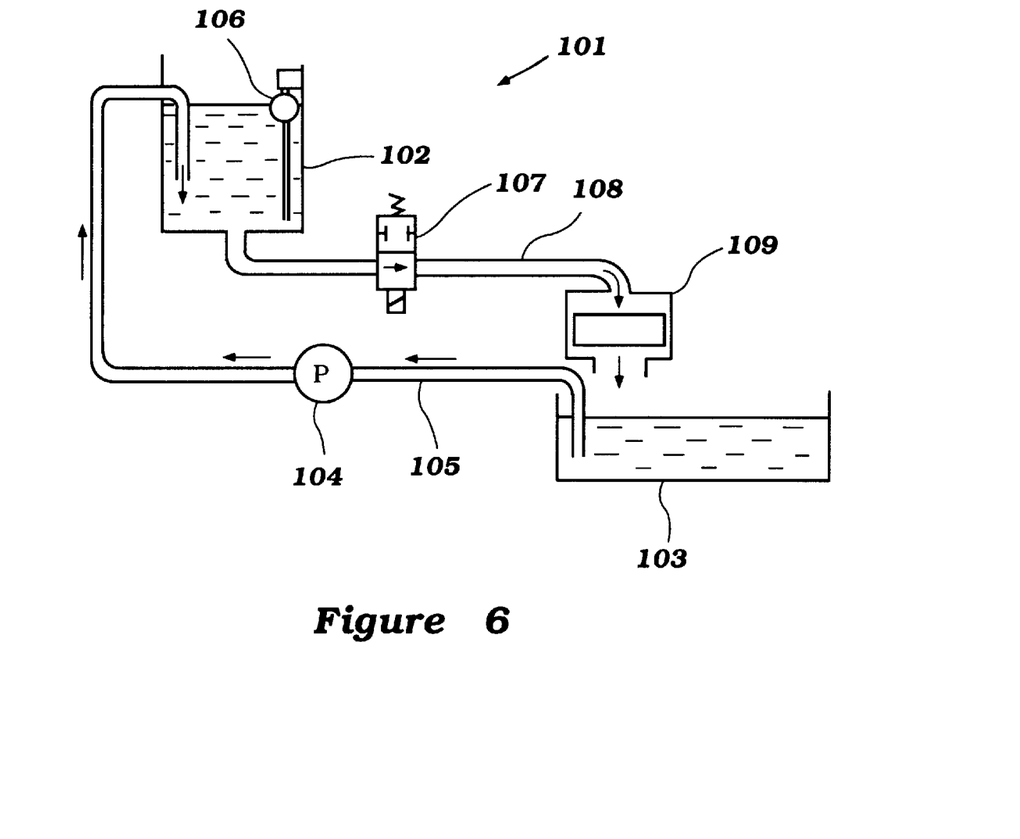
FIG. 6 is a partially schematic cross-sectional view showing an automatic filter cleaning apparatus in accordance with another embodiment of the invention.
Figure 7:
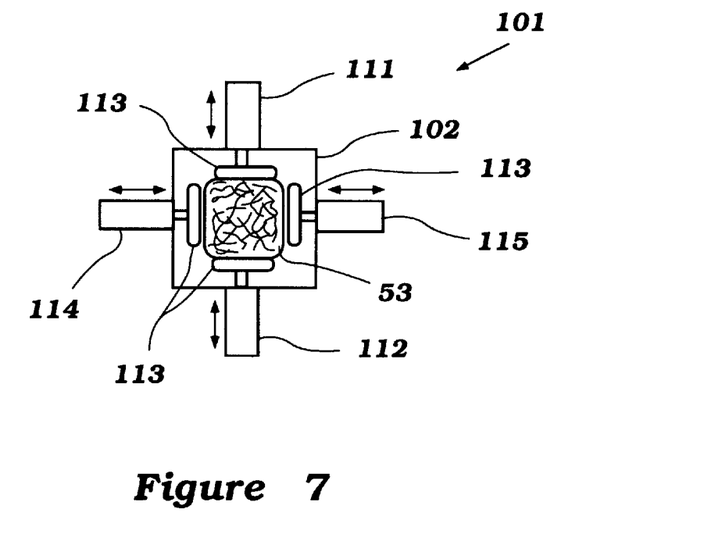
FIG. 7 is a cross-sectional view taken through the washing tank and showing how the filter element is kneaded.

Next will be described the mechanism for washing or servicing the amorphous filter element from the filter 53. This apparatus is shown best in FIGS. 6 and 7, and is indicated generally by the reference numeral 101. This includes a washing tank 102 in which the filter element, shown in FIG. 7 is positioned.

A supply of cleaning liquid is supplied to this tank 102 from a cleaning liquid supply tank 103. A pump 104 draws this cleaning liquid through a line 105 and delivers it to the tank 102. A float-operated valve 106 or other liquid level sensing device is provided in the tank 102 to shut off the pump 104 when the desired cleaning level is reached.

There is also provided a drain valve 107 of the solenoid operated type, which will permit the draining of fluid back to the supply tank 103 through a return line 108. Also contaminants removed from the filter element 53 can be thus drained from the washing tank 102. There is also provided a rare earth separator 109 in this return line that will separate out the rare earth that is used in the filter element 53 for reclamation.

The washing tank 102 is provided with a kneading mechanism that is comprised of a first pair of oppositely positioned cylinders 111 and 112 that operate pressing elements 113 that can compress and expand the filter element 53. A second pair of actuating motors 114 and 115 also operate pressing elements 113 on diametrically opposite sides so as to squeeze and release the filter element 53 and help the flow of purging fluid therethrough.

After this pressing and releasing operation has been completed for several times, the solenoid valve 107 is open and the fluid and contaminants are drained. After the draining, the valve 107 is closed and the float-operated valve 106 again is permitted to actuate the pump 104 so as to refill the tank and repeat the washing for as many cycles as necessary. Hence, the cleaning of the filter element 53 need not be done manually and thus, the undesirable manual task is avoided.

Figure 8:
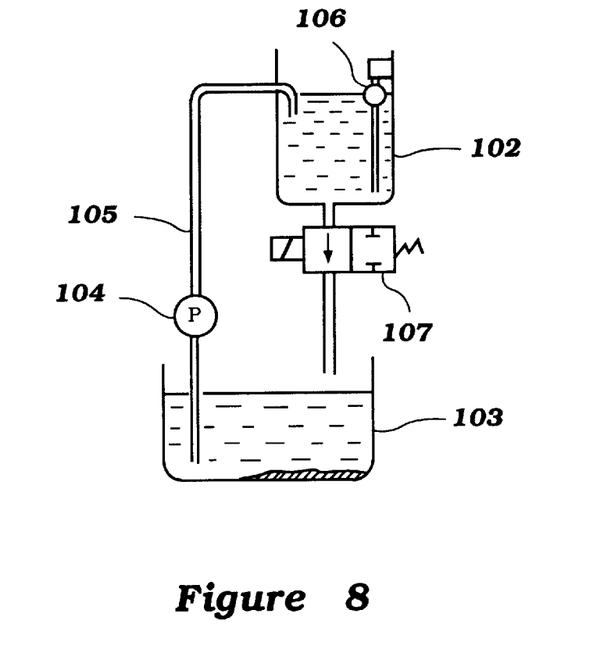
FIG. 8 is a partial cross-sectional view, in part similar to FIG. 6, and shows another embodiment of the invention.

FIG. 8 shows another orientation in which the components of the cleaning embodiment may be oriented so as to provide a more compact assembly.

Figure 9:
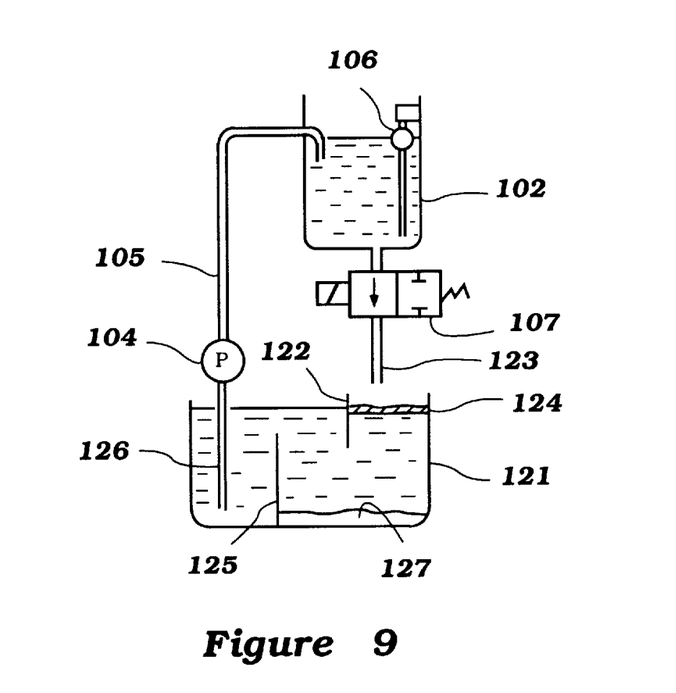
FIG. 9 is a partial cross-sectional view, in part similar to FIGS. 6 and 8, and shows a still further embodiment of the invention.

FIG. 9 shows another embodiment but in this embodiment, the tank for the cleaning fluid, indicated in this embodiment by the reference numeral 121, is provided with an upper baffle 122 under the drain line 123 from the solenoid valve 107. This causes lighter particles indicated at 124 to accumulate at the top of the tank 121 and be precluded from re-entering the washing system.

A further internal baffle 125 is provided at the lower end of the tank 121 away from the pump inlet 126 so as to permit heavier materials to accumulate as seen at 127.

Figure 10:
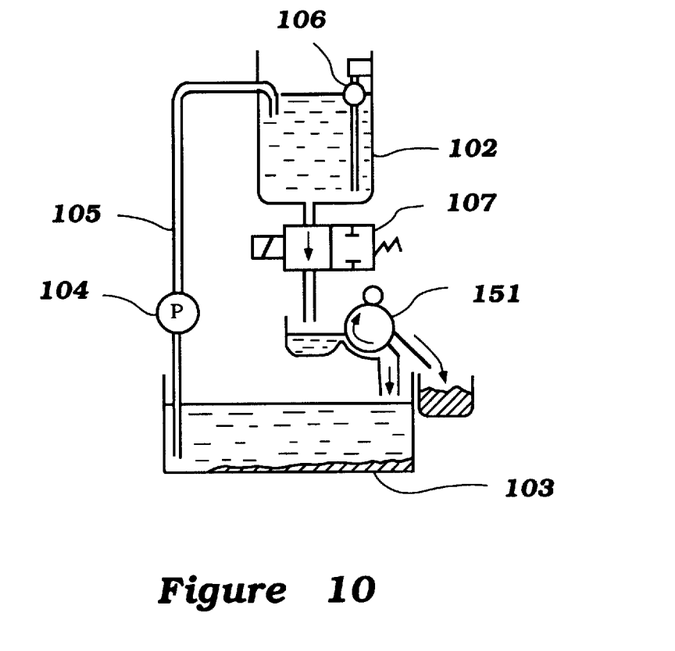
FIG. 10 is a partial cross-sectional view, in part similar to FIGS. 6, 8 and 9, and shows a still further embodiment of the invention.

FIG. 10 shows another embodiment which is like the embodiment of FIG. 8 but also includes a magnetic type of separator, indicated generally by the reference numeral 151 for removing separated magnetic particles from the washing fluid. This type of device can be the same as the magnetic separator 25 in the main embodiment.

Figure 11:
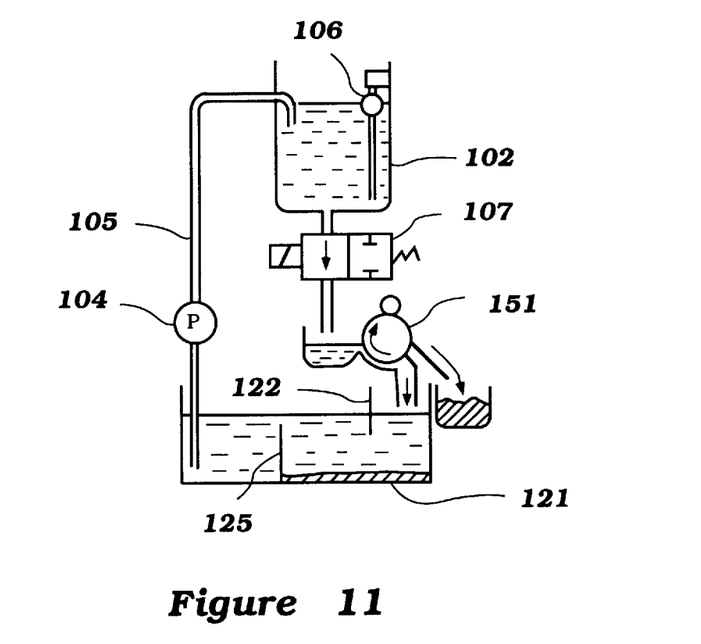
FIG. 11 is a partial cross-sectional view, in part similar to FIGS. 6 and 8–10, and shows yet another embodiment of the invention.

FIG. 11 shows an embodiment like FIG. 10 but employing the baffling as shown in FIG. 9. Hence, the elements of this embodiment which are the same as the embodiment previously described have been identified by the same reference numeral. Further description of these embodiments is, therefore, not believed to be necessary to permit those skilled in the art to practice this invention.

Figure 12:
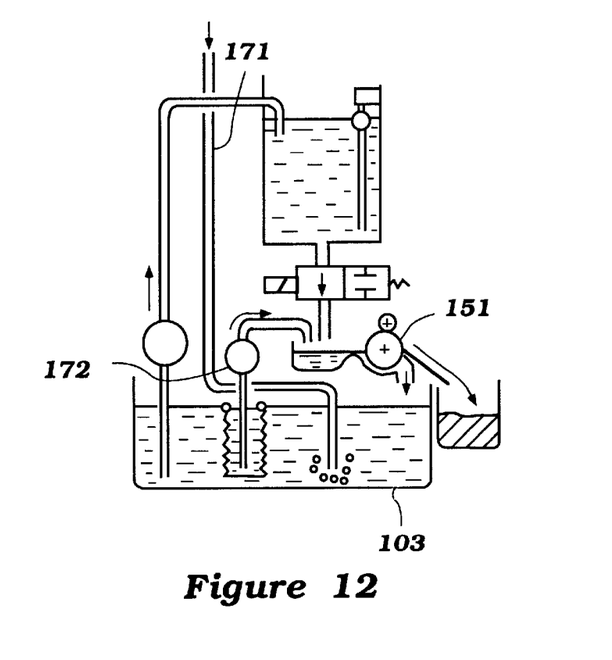
FIG. 12 is a partial cross-sectional view, in part similar to FIGS. 6 and 8–11, and shows yet another embodiment of the invention.

FIG. 12 is a view in part similar to FIG. 10, and shows a further embodiment of the invention which is useful in automatically removing the sludge from the washing fluid-containing tank 103. In connection with this embodiment, a compressed air line 171 is provided that supplies compressed air into the tank 103 at its lower level to cause agitation and move the heavier particles back into the liquid. Then, a sludge pump 172 can pick up these particles and return them back to the filter portion 151 where they will be passed off into the separator storage tank for this unit.

Thus, from the foregoing description, it should be readily apparent that the various embodiments disclosed are very effective in providing a very efficient system for cleaning cooling fluid in a machining line and ensuring continuous operation. If servicing is required, it can be done on an occasional basis as necessary and without completely shutting down the line. Furthermore, an improved and simplified automatic washing device is provided for the filtered unit so as to minimize objectionable manual labor. Of course, the foregoing description is that of a preferred embodiment of the invention and various changes and modifications may be made without departing from the spirit and scope of the invention, as defined by the appended claims.

I claim:

1. A system for recovery and cleaning a machining liquid coolant comprised of a coolant storage tank for storing coolant, a machining station wherein a machining operation is performed, and a coolant circulating and purifying line for circulating coolant from said coolant storage tank to said machining station and back to said coolant storage tank, a magnetic separator for separating magnetic particles from said coolant, an amorphous filter for separating particles from said coolant, and a mechanical filter for filtering foreign particles from said coolant, said coolant circulating and purifying line circulating coolant in a series relationship through said magnetic separator, said amorphous filter and said mechanical filter.

2. The system of claim 1, wherein the magnetic separator comprises a rare earth separator.

3. The system of claim 1, wherein the magnetic separator removes particles having a larger particle size than the amorphous filter and the amorphous filter removes particles having a larger size than the mechanical filter.

4. The system of claim 3, wherein the coolant is passed first through the magnetic separator then through the amorphous filter, and then through the mechanical filter.

5. The system of claim 4, wherein the coolant storage tank is disposed between the magnetic separator and the amorphous filter.

6. The system of claim 1, wherein the machining station has a tray where the coolant and machining particles from the machining operation are collected and returned, and further including a flushing system for delivering coolant from the coolant storage tank to said tray without passing through the machining station for flushing the particles and spent coolant from the machining station.

7. The system of claim 6, wherein a first pump delivers the coolant through the flushing system to the tray and a second pump pumps coolant through the coolant circulating and purifying line.

8. The system of claim 7, wherein the magnetic separator is in a return line that returns the coolant to the storage tank and which forms a portion of the coolant circulating and purifying line.

9. The system of claim 8, further including a sensor for sensing the flow of coolant to the machining station, and a flow control for maintaining a predetermined amount of flow to the machining station.

10. The system of claim 9, wherein the magnetic separator comprises a rare earth separator.

11. The system of claim 9, wherein the magnetic separator removes particles having a larger particle size than the amorphous filter and the amorphous filter removes particles having a larger size than the mechanical filter.

12. The system of claim 11, wherein the coolant is passed first through the magnetic separator then through the amorphous filter, and then through the mechanical filter.

13. The system of claim 12, wherein the coolant storage tank is disposed between the magnetic separator and the amorphous filter.

14. The system of claim 1, wherein there are manual shut off valves in the line on the inlet and outlet sides of at least one of the filters.

15. The system of claim 14, wherein there is also a bypass line between the coolant storage tank and the machining station so that coolant can be supplied to the machining station even when the manual shut off valves are closed.

16. The system of claim 15, wherein there is a pressure indicator between one of the manual shut of valves and the at least one filter.

17. The system of claim 14, wherein there are manual shut off valves in the line on the inlet and outlet sides of both of the filters.

18. The system of claim 17, wherein there is also a bypass line between the coolant storage tank and the machining station through which coolant can be supplied to the machining station even when the manual shut off valves are closed.

19. The system of claim 18, wherein there is a pressure indicator between one of the manual shut off valves associated with one of the filters and the respective filter.

20. The system of claim 1, further including a pump between the coolant storage tank and the filters for pumping the coolant.

21. The system of claim 20, further including a check valve between the pump and the filters for permitting the coolant to flow from the pump to the filters and precluding coolant from returning to the coolant storage tank through the pump.

* * * * *

UNITED STATES PATENT AND TRADEMARK OFFICE
CERTIFICATE OF CORRECTION

PATENT NO. : 6,015,487
DATED : January 18, 2000
INVENTOR(S) : Kazuaki Mori

It is certified that error appears in the above-identified patent and that said Letters Patent is hereby corrected as shown below:

Title page,
Item [30], Foreign Application Priority Data of the Patent Grant please delete:
[Apr. 19, 1998 - JP - Japan - 10-088379]

Signed and Sealed this

Sixth Day of November, 2001

*Attest:*

NICHOLAS P. GODICI
*Attesting Officer*     *Acting Director of the United States Patent and Trademark Office*